(12) United States Patent
Ohsawa

(10) Patent No.: US 8,047,176 B2
(45) Date of Patent: Nov. 1, 2011

(54) BALANCER APPARATUS FOR AN ENGINE

(75) Inventor: Hiroshi Ohsawa, Shizuoka-ken (JP)

(73) Assignee: Suzuki Motor Corporation, Shizuoka-ken (JP)

(*) Notice: Subject to any disclaimer, the term of this patent is extended or adjusted under 35 U.S.C. 154(b) by 699 days.

(21) Appl. No.: 12/283,292

(22) Filed: Sep. 10, 2008

(65) Prior Publication Data
US 2009/0064962 A1 Mar. 12, 2009

(30) Foreign Application Priority Data
Sep. 11, 2007 (JP) .................................. 2007-235186

(51) Int. Cl.
*F02B 75/06* (2006.01)
(52) U.S. Cl. .................................. 123/192.2; 123/196 R
(58) Field of Classification Search ............... 123/192.2, 123/196 R
See application file for complete search history.

(56) References Cited

U.S. PATENT DOCUMENTS

| 5,791,309 A * | 8/1998 | Yamazaki et al. ......... 123/192.2 |
| 6,189,499 B1 * | 2/2001 | Iwata et al. ................ 123/192.2 |
| 6,758,183 B2 * | 7/2004 | Endo et al. ................ 123/192.2 |

FOREIGN PATENT DOCUMENTS

| JP | 2000-009291 | 1/2000 |
| JP | 2000-065145 | 3/2000 |

* cited by examiner

*Primary Examiner* — Noah Kamen
(74) *Attorney, Agent, or Firm* — Flynn, Thiel, Boutell & Tanis, P.C.

(57) ABSTRACT

In a balancer apparatus of an engine having an oil pump, a space on a chain side and a space on an oil strainer side are partitioned by a projecting portion projecting in a direction which perpendicularly crosses balancer shafts in a balancer housing formed on an oil pump housing. An oil strainer is attached to a side wall on the anti-chain side of the projecting portion, and a chain tensioner for applying tension to a chain is arranged in the space on the chain side formed by enlarging the attaching surface of the oil pan outwardly so as to enclose the projecting portion. Thus oil which has been stirred by the chain and in which air has been mixed is prevented from being sucked into the oil strainer.

2 Claims, 5 Drawing Sheets

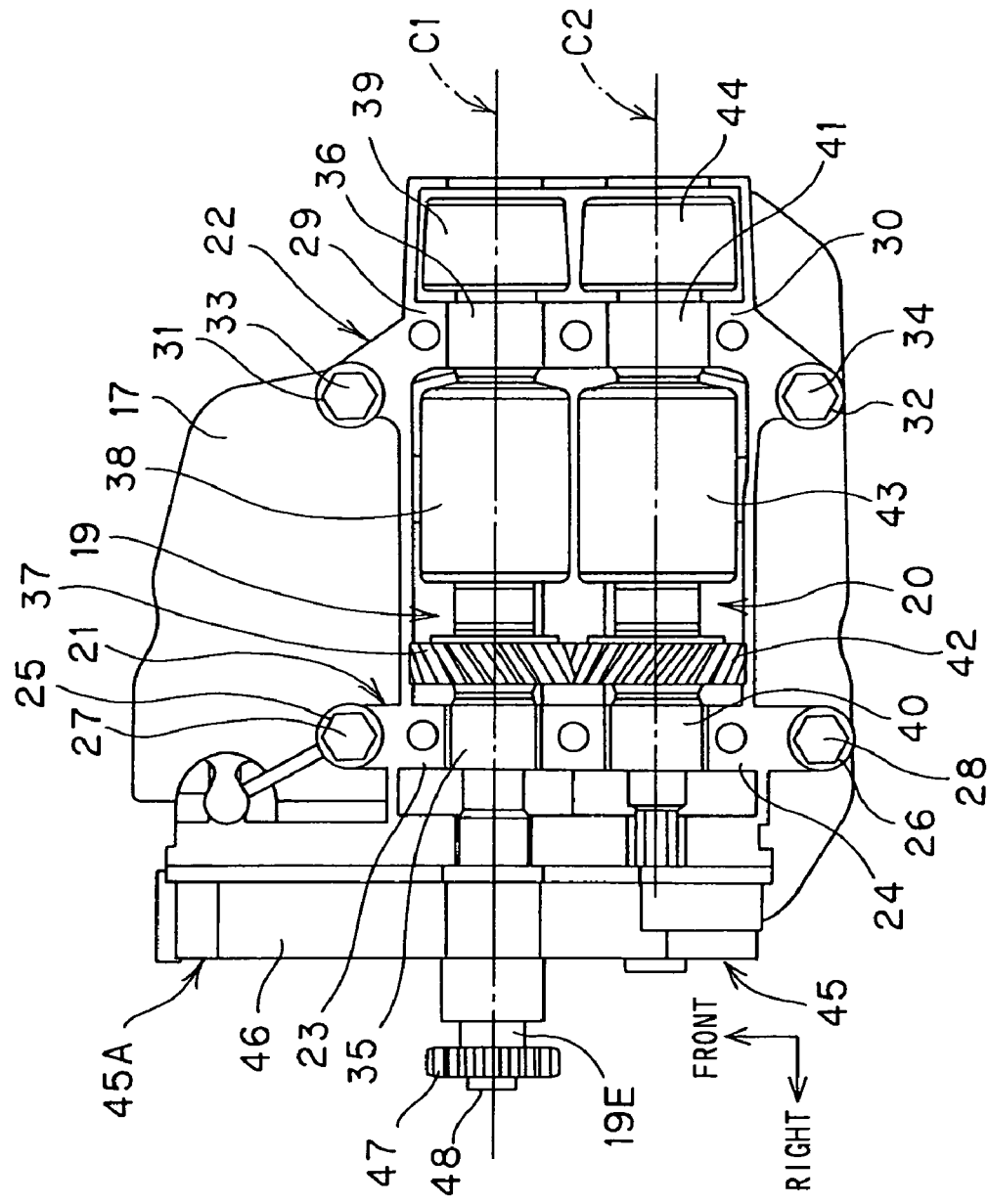

BALANCER APPARATUS FOR AN ENGINE

FIELD OF THE INVENTION

The invention relates to a balancer apparatus for an engine, and more particularly, to a balancer apparatus for an internal combustion engine having an oil pump.

BACKGROUND OF THE INVENTION

In, a 4-cycle 4-cylinder internal combustion engine for a vehicle, a secondary inertia force occurs at a center of gravity of a piston connecting rod system due to its layout.

As means for cancelling the secondary inertia force, the engine has a balancer apparatus for rotating balancer shafts at a speed that is twice as high as an engine rotational speed.

As a method of disposing the balancer apparatus, generally, there is a method whereby the balancer apparatus is integrated with a cylinder block or a method whereby the balancer apparatus is attached to a lower crank casing or an oil pan at a position just under a crank shaft.

In the case of the disposing method of attaching the balancer apparatus to the lower crank casing or the oil pan at the position just under the crank shaft, there is such a construction that the balancer shafts and the crank shaft are coupled by a chain. In the case of using the chain as mentioned above, it is indispensable to provide a chain tensioner.

Hitherto, as a driving apparatus of a balancer unit, JP-A-2000-9291 discloses an apparatus with a balancer apparatus arranged just under a crankshaft, a chain wound between a sprocket of the crank shaft and a sprocket of a balancer shaft of the balancer apparatus, and a cover provided in the oil pan for shutting off the sprocket of the crank shaft and a part of the chain from oil in the oil pan, thereby preventing an air-mixed oil from being sucked into an engine.

JP-A-2000-65145 discloses a balancer apparatus of a reciprocating piston engine, wherein the balancer apparatus is arranged just under a crank shaft, a chain is wound between a sprocket of a crank shaft and a sprocket of a balancer shaft of the balancer apparatus, a rotor of a lubricating oil pump is directly coupled with one of two balancer shafts, and a chain tensioner is arranged in an edge portion of the other balancer shaft, thereby miniaturizing the balancer apparatus.

Hitherto, a balancer apparatus of an engine having an oil pump is attached to the lower crank casing or the oil pan at a position just under the crank shaft. Since the balancer shafts and the crank shaft are coupled by the chain, there are such inconveniences in that the oil which has been stirred by the chain and in which the air has been mixed is liable to be sucked into the oil strainer and thus performance of the balancer apparatus deteriorates due to the layout or to the arrangement of the chain tensioner for applying tension to the chain.

Therefore, an object of the invention is to provide a balancer apparatus for an engine having an oil pump, wherein oil in which the air has been mixed is prevented from being sucked into the oil pump, and thus assembling performance of the balancer apparatus is improved.

SUMMARY OF THE INVENTION

According to the invention, there is provided a balancer apparatus of an engine, in which a balancer housing for enclosing a pair of balancer shafts which rotate in opposite directions is arranged under a cylinder block which faces an oil pan, an oil pump housing for enclosing an oil pump is integrally coupled with an edge portion in an axial direction of the balancer housing, a balancer sprocket is arranged in a portion where one of the balancer shafts is projected from the oil pump housing, a rotation of a crank shaft is propagated to the balancer sprocket through a chain, and the oil pump is driven by the other of the balancer shafts. When the cylinder block is viewed from an attaching surface side of the oil pan, a projecting portion which projects in the direction which perpendicularly crosses the balancer shaft in the balancer housing is formed in the oil pump housing, an oil strainer is attached to a side wall on an anti-chain side of the projecting portion, and a chain tensioner which applies tension to the chain is arranged in a space formed by enlarging the attaching surface of the oil pan outwardly so as to enclose the projecting portion.

According to the balancer apparatus of the engine of the invention, oil in which air has been mixed is prevented from being sucked into the oil pump, and the performance of the balancer apparatus is improved.

According to the invention, preventing the oil in which the air has been mixed from being sucked into the oil pump and improving the assembling performance or ease of assembly of the balancer apparatus is realized by changing a layout of the oil strainer and the chain tensioner.

BRIEF DESCRIPTION OF THE DRAWINGS

FIG. 5 is a bottom view of the balancer apparatus with a lower housing removed.

DETAILED DESCRIPTION OF THE INVENTION

Figure 1:
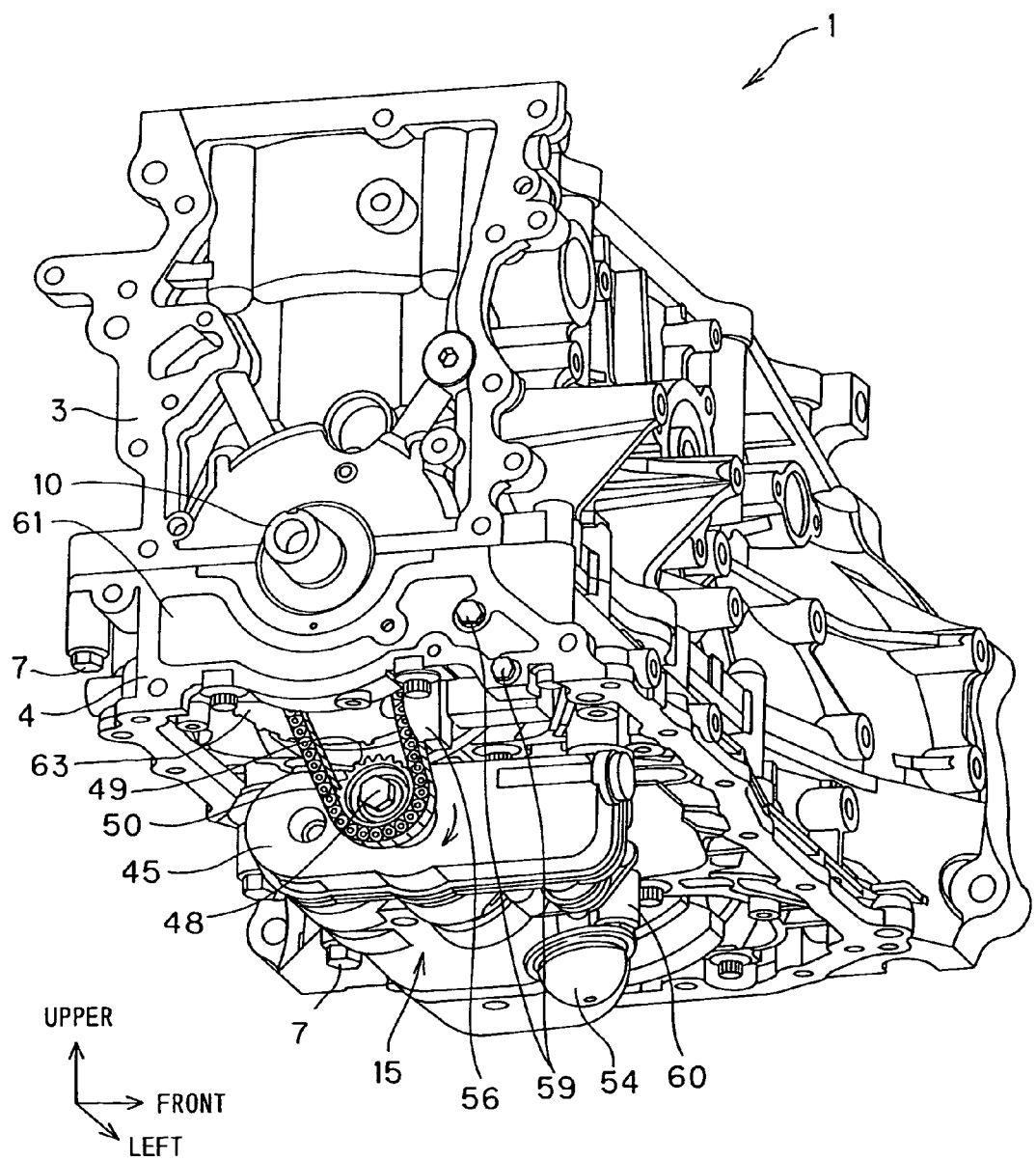
FIG. 1 is a perspective view of an engine having a balancer apparatus as viewed from an oblique lower position with an oil pan removed.
Figure 2:
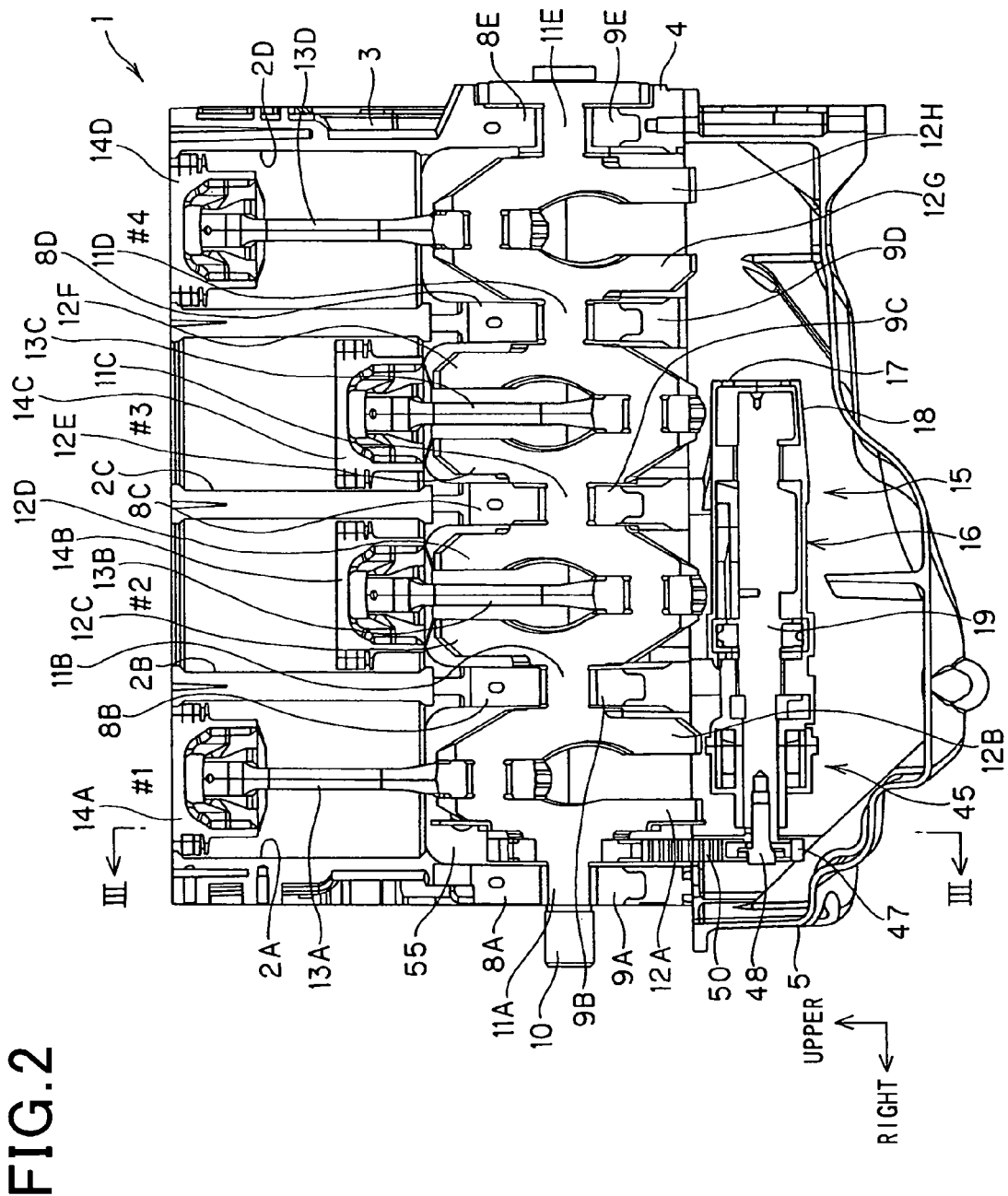
FIG. 2 is a cross-sectional view of the engine having the balancer apparatus.

In FIGS. 1 to 4, reference numeral 1 denotes an engine for a vehicle. As shown in FIG. 2, the engine 1 is a 4-cycle 4-cylinder internal combustion engine. The engine 1 has: a cylinder block 3 in which first to fourth cylinder walls 2A to 2D of the cylinders (#1 to #4) have been formed; a lower crank casing 4 attached to a lower surface of the cylinder block 3; an oil pan 5 attached to a lower surface of the lower crank casing 4; and a cylinder head 6 attached to an upper surface of the cylinder block 3. The lower crank casing 4 is assembled to the lower surface of the cylinder block 3 by a plurality of casing attaching bolts 7.

First to fifth journal portions 11A to 11E of a crank shaft 10 are axially supported between first to fifth block-side journal wall portions 8A to 8E in a lower portion of the cylinder block 3 and first to fifth casing-side journal wall portions 9A to 9E in an upper portion of the lower crank casing 4, respectively.

First to eighth counter weights 12A to 12H are provided for the crank shaft 10 with respect to the cylinders. First to fourth pistons 14A to 14D which reciprocate in the first to fourth cylinders 2A to 2D of the cylinder block 3 are coupled with the crank shaft 10 through first to fourth connecting rods 13A to 13D, respectively.

As shown in FIGS. 1 and 2, under the cylinder block 3 of the engine 1, that is, under the lower crank casing 4, a balancer apparatus 15 is arranged in the oil pan 5. The balancer apparatus 15 cancels a secondary inertia force of a center of gravity of each piston 14A-14D in combination with each corresponding connecting rod 13A-13D.

As shown in FIGS. 1, 2, 4 and 5, the balancer apparatus 15 has a balancer housing 16. The balancer housing 16 has an upper housing 17 and a lower housing 18. Under the cylinder block 3 which faces the oil pan 5, the balancer apparatus 15 is arranged so as to enclose a first balancer shaft (drive shaft) 19 and a second balancer shaft (driven shaft) 20 each of which rotates at a speed (double speed) which is twice as high as a rotational speed of the crank shaft 10 as a pair of balancer shafts which rotate in opposite directions.

As shown in FIG. 5, under the crank shaft 10, the first balancer shaft 19 and the second balancer shaft 20 are arranged in such a manner that their axes C1 and C2 extend in parallel with the crank shaft 10 and extend in parallel with an abutting surface of the lower crank casing 4 and the oil pan 5. The first balancer shaft 19 is arranged on the vehicle front side of the second balancer shaft 20.

As shown in a bottom view of FIG. 5 in a state where the lower housing 18 of the balancer apparatus 15 has been removed, the upper housing 17 has a right axial supporting portion 21 and a left axial supporting portion 22 each of which extends in a vehicle front/rear direction at a predetermined interval so as to axially support the first and second balancer shafts 19 and 20 extending in a vehicle width direction.

The right axial supporting portion 21 has: a first right bearing portion 23 for axially supporting the right side of the first balancer shaft 19; a second right bearing portion 24 for axially supporting the right side of the second balancer shaft 20; a first right engine attaching boss 25 juxtaposed with the first right bearing portion 23; and a second right engine attaching boss 26 juxtaposed with the second right bearing portion 24. A first right attaching bolt 27 is attached to the first right engine attaching boss 25. A second right attaching bolt 28 is attached to the second right engine attaching boss 26.

The left axial supporting portion 22 has: a first left bearing portion 29 for axially supporting the left side of the first balancer shaft 19; a second left bearing portion 30 for axially supporting the left side of the second balancer shaft 20; a first left engine attaching boss 31 juxtaposed with the first left bearing portion 29; and a second left engine attaching boss 32 juxtaposed with the second left bearing portion 30. A first left attaching bolt 33 is attached to the first left engine attaching boss 31. A second left attaching bolt 34 is attached to the second left engine attaching boss 32.

Although not shown, the lower housing 18 has a right axial supporting portion and a left axial supporting portion corresponding to the right axial supporting portion 21 and the left axial supporting portion 22 of the upper housing 17.

As shown in FIG. 5, the first balancer shaft 19 has: a first right journal portion 35 which is axially supported to the first right bearing portion 23; a first left journal portion 36 which is axially supported to the first left bearing portion 29; between the first right journal portion 35 and the first left journal portion 36, a first balancer gear 37 on the first right journal portion 35 side and a first central balancer weight 38 on the first left journal portion 36 side; and a first edge-side balancer weight 39 which is supported in a cantilever state on the vehicle leftward side of the first left journal portion 36.

The second balancer shaft 20 has: a second right journal portion 40 which is axially supported to the second right bearing portion 24; a second left journal portion 41 which is axially supported to the second left bearing portion 30; between the second right journal portion 40 and the second left journal portion 41, a second balancer gear 42 which engages with the first balancer gear 37 on the second right journal portion 40 side and a second central balancer weight 43 on the second left journal portion 41 side; and a second edge-side balancer weight 44 which is supported in a cantilever state on the vehicle leftward side of the second left journal portion 41.

Figure 4:
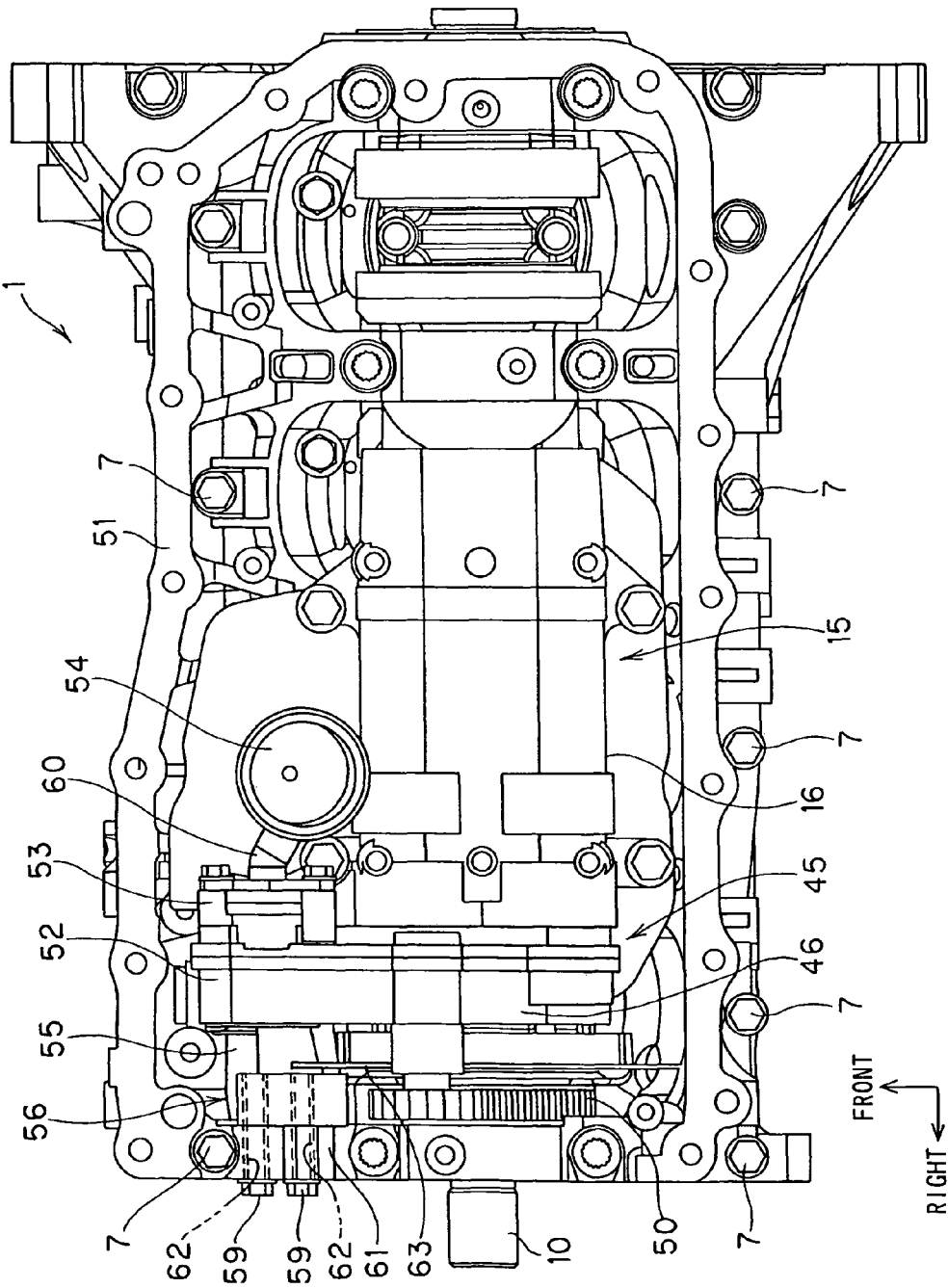
FIG. 4 is a bottom view of the engine having the balancer apparatus with the oil pan removed.

As shown in FIG. 4, an oil pump housing 46 for enclosing an oil pump 45 is integratedly coupled with an edge portion in the axial direction of the balancer housing 16, that is, a right edge portion of the balancer housing 16. The oil pump 45 is attached to a right edge portion of the second balancer shaft 20.

As shown in FIG. 5, a balancer sprocket 47 is provided for the first balancer shaft 19 as one of the balancer shafts, that is, it is arranged in a portion 19E projected from the oil pump housing 46. As shown in FIGS. 1 and 5, the balancer sprocket 47 is attached to a front edge of the first balancer shaft 19 by a sprocket attaching bolt 48.

Figure 3:
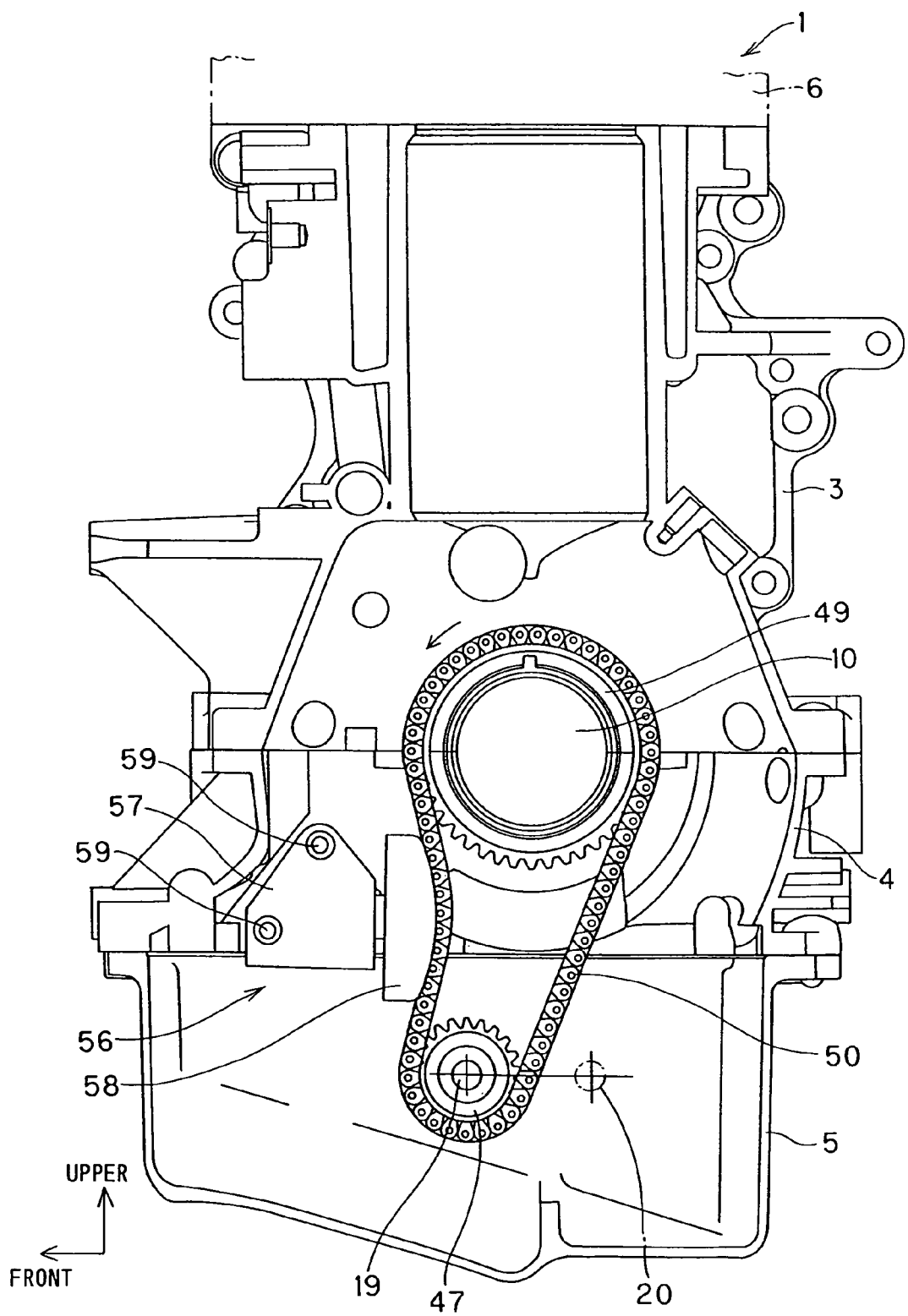
FIG. 3 is an enlarged cross sectional view of the engine taken along the line III-III in FIG. 2.

As shown in FIG. 3, a chain 50 is wound between the balancer sprocket 47 and a crank sprocket 49 attached to the crank shaft 10.

In this case, the number of teeth of the balancer sprocket 47 is set to the half of the number of teeth of the crank sprocket 49. Therefore, when the rotation of the crank shaft 10 is propagated to the balancer sprocket 47 through the chain 50, the balancer sprocket 47 rotates at a speed which is twice as high as a rotational speed of the crank sprocket 49 of the crank shaft 10, that is, a speed which is twice as high as a rotational speed of the engine. Thus, the first balancer shaft 19 having the balancer sprocket 47 rotates at a speed that is twice as fast as the engine rotational speed. The second balancer shaft 20 coupled with the first balancer shaft 19 through the first balancer gear 37 and the second balancer gear 42 at a rotational speed ratio of (1:1) rotates at the speed (double speed) which is twice as high as the engine rotational speed in a manner similar to the first balancer shaft 19. Thus, a secondary vibratory force generated by the engine 1, that is, the secondary inertia force of the center of gravity of each piston 14 and each corresponding connecting rod 13 can be cancelled.

In the balancer apparatus 15, while the rotation of the crank shaft 10 is propagated to the balancer sprocket 47 through the chain 50, the oil pump 45 is driven by the second balancer shaft 20 as another balancer shaft.

As shown in FIG. 4, when the cylinder block 3 is seen from the side of the attaching surface of the oil pan 5, that is, when it is seen from the side of an oil pan attaching surface 51 under the crank lower casing 4, an oil passage 45A communicated with the oil pump 45 is formed in the oil pump housing 46. A projecting portion 52 projects in the direction which perpendicularly crosses the first and second balancer shafts 19 and 20 in the balancer housing 16.

As shown in FIGS. 1 and 4, an oil strainer 54 for sucking the oil into the oil pump 45 is attached to a side wall 53 on the anti-chain side of the projecting portion 52. A chain tensioner 56 for applying tension to the chain 50 is arranged in a space 55 formed by enlarging the oil pan attaching surface 51 outwardly (toward the vehicle front side) so as to enclose the projecting portion 52.

In this case, as shown in FIGS. 1 and 3, the chain 50 is rotated clockwise (shown by an arrow in each of FIGS. 1 and 3) when it is seen from the rightward position of the vehicle. The chain tensioner 56 is arranged between the crank shaft 10 and the first balancer shaft 19 and at a vehicle front side relative to the chain 50.

The chain tensioner 56 is formed by: a tensioner main body portion 57; and a chain contact portion 58 which is reciprocated by the tensioner main body portion 57 and contacts the outer surface of the chain 50 from vehicle front side. Further, the chain tensioner 56 is arranged between the first casing-side journal wall portion 9A of the lower crank casing 4 and the first counter weight 12A of the crank shaft 10 and is attached to an edge portion wall 61 of the lower crank casing 4 by tensioner attaching bolts 59 from the vehicle rightward side as shown in FIG. 1.

As shown in FIGS. 1 and 4, the oil strainer 54 is arranged on the vehicle front side near the first balancer shaft 19, attached to a vehicle front side portion of the oil pump housing 46, and connected to an oil sucking pipe 60 coupled to the oil pump 45.

By using such a structure, when the cylinder block 3 is viewed from the attaching surface side of the oil pan 5, the projecting portion 52 projecting in the direction which perpendicularly crosses the balancer shafts 19 and 20 in the balancer housing 16 is formed in the oil pump housing 46 and the oil strainer 54 is attached to the side wall 53 on the anti-chain side of the projecting portion 52. The space on the chain 50 side and the space on the oil strainer 54 side can be partitioned by the projecting portion 52. Thus it is possible to prevent oil which has been stirred by the chain 50 and in which the air has been mixed from being sucked into the oil strainer 54.

Since the chain tensioner 56 is arranged in the space 55 formed by enlarging the oil pan attaching surface 51 outwardly so as to enclose the projecting portion 52, the chain tensioner 56 can be assembled from the position under the cylinder block 3 without being obstructed by a timing chain. Thus ease of assembly and assembling workability of the chain tensioner 56 can be improved.

Further, the structure prevents air-mixed oil from being sucked in to the oil pump 45, and the ease of assembly and assembling performance of the balancer apparatus 15 can be improved.

As shown in FIGS. 1 and 4, through-holes 62 are formed in the edge portion wall of the cylinder block 3 which faces the chain 50, that is, in the edge portion wall 61 of the lower crank casing 4. The chain tensioner 56 is fastened to the inside of the edge portion wall 61 by the tensioner attaching bolts 59 as bolts which are inserted into the through-holes 62 from the vehicle rightward position as an outward position. As shown in FIGS. 1 and 2, a sensor plate 63 adjacent to the chain 50 is attached to an outer surface of the first counter weight 12A of the crank shaft 10.

By using such a structure, since the through-holes 62 are formed in the edge portion wall 61 of the cylinder block 3 which faces the chain 50 and the chain tensioner 56 is fastened to the inside of the edge portion wall 61 by the tensioner attaching bolts 59 which are inserted into the through-holes 62 from the outward position, the work for fastening the chain tensioner 56 to the lower crank casing 4 serving as a cylinder block 3 can be executed from the outward position of the cylinder block 3, thus resulting in ease of assembly and assembling workability of the chain tensioner 56 being improved.

Since the tensioner attaching bolts 59 are attached to the lower crank casing 4 from the vehicle rightward side and the head portions of the tensioner attaching bolts 59 do not project to the balancer apparatus 15 side, a space around the balancer apparatus 15 is enlarged and ease of assembly or assembling workability of the balancer apparatus 15 to the cylinder block 3 is improved.

The structure in which the projecting portion is formed on the oil pump housing or the layout of the oil strainer and the chain tensioner can be changed to apply to other engines.

What is claimed is:

1. A balancer apparatus of an internal combustion engine comprising a balancer housing for enclosing a pair of balancer shafts that rotate in opposite directions, said balancer housing being arranged under a cylinder block that faces an oil pan, an oil pump housing for enclosing an oil pump is integrally coupled in an axial direction with an edge portion of said balancer housing, a balancer sprocket is arranged in a portion where one of the balancer shafts projects from the oil pump housing, a rotation of a crank shaft is propagated to the balancer sprocket through a chain, and the oil pump is driven by the other of the balancer shafts, wherein when the cylinder block is viewed from an attaching surface side of the oil pan, a projecting portion that projects in the direction which perpendicularly crosses the balancer shaft in the balancer housing is formed in the oil pump housing, an oil strainer is attached to a side wall on an anti-chain side of the projecting portion, and a chain tensioner which applies tension to the chain is arranged in a space formed by enlarging the attaching surface of the oil pan outwardly so as to enclose the projecting portion.

2. A balancer apparatus of the internal combustion engine according to claim 1, wherein a through-hole is formed in an edge portion wall of the cylinder block which faces the chain and the chain tensioner is coupled with the inside of the edge portion wall of the cylinder block by a bolt inserted into the through-hole from an outward position.

* * * * *